(12) United States Patent
Butz

(10) Patent No.: US 11,576,760 B2
(45) Date of Patent: Feb. 14, 2023

(54) INTERDENTAL CLEANER

(71) Applicant: SUNSTAR SUISSE S.A., Etoy (CH)

(72) Inventor: Jürgen Butz, Schönau (DE)

(73) Assignee: SUNSTAR SUISSE S.A., Etoy (CH)

( * ) Notice: Subject to any disclaimer, the term of this patent is extended or adjusted under 35 U.S.C. 154(b) by 825 days.

(21) Appl. No.: 16/096,326

(22) PCT Filed: Apr. 24, 2017

(86) PCT No.: PCT/EP2017/000507
§ 371 (c)(1),
(2) Date: Oct. 25, 2018

(87) PCT Pub. No.: WO2017/186344
PCT Pub. Date: Nov. 2, 2017

(65) Prior Publication Data
US 2019/0125506 A1 May 2, 2019

(30) Foreign Application Priority Data

Apr. 26, 2016 (DE) ...................... 10 2016 005 012.8

(51) Int. Cl.
| | |
|---|---|
| *A61C 15/02* | (2006.01) |
| *A61C 15/00* | (2006.01) |
| *A46B 5/00* | (2006.01) |
| *A46B 15/00* | (2006.01) |
| *A46B 3/00* | (2006.01) |

(52) U.S. Cl.
CPC ............ *A61C 15/02* (2013.01); *A46B 5/0066* (2013.01); *A46B 15/0069* (2013.01); *A61C 15/00* (2013.01); *A46B 3/005* (2013.01); *A46B 2200/108* (2013.01)

(58) Field of Classification Search
CPC ....... A61C 15/00; A61C 15/02; A61C 15/046; A46B 15/0069; A46B 5/0066; A46B 5/0079; A46B 3/005; A46B 2200/108
USPC ......................................................... 15/167.1
See application file for complete search history.

(56) References Cited

U.S. PATENT DOCUMENTS

| | | | |
|---|---|---|---|
| 4,319,377 A | * | 3/1982 | Tarrson ..................... A46B 7/04 132/321 |
| 4,683,875 A | | 8/1987 | Rabinowitz |
| 5,216,787 A | * | 6/1993 | Custer ..................... B29C 65/48 24/585.12 |

(Continued)

FOREIGN PATENT DOCUMENTS

| | | |
|---|---|---|
| DE | 31 52 404 C2 | 1/1996 |
| DE | 10 2006 005 616 A1 | 8/2007 |

(Continued)

*Primary Examiner* — Rachel R Steitz
*Assistant Examiner* — Karim Asqiriba
(74) *Attorney, Agent, or Firm* — McGlew and Tuttle, P.C.

(57) ABSTRACT

An interdental cleaner has a rod-shaped support, which is made of plastic and, in one end region thereof, is provided with a cleaning part made of a flexible plastic, and a handle part made of plastic. The support, at a support end facing the handle part, is integrally connected to the handle part in a connection region via a web. The connection region is configured as a joint, and the web is provided at least partially with a sheath made of a flexible plastic. Provision is made here that the web has at least one protruding web rib, and/or that at least one rib is formed on the outer face of the sheath.

30 Claims, 8 Drawing Sheets

(56) References Cited

U.S. PATENT DOCUMENTS

| | | | |
|---|---|---|---|
| 5,630,244 A * | 5/1997 | Chang | A46B 5/0062 15/143.1 |
| 8,567,000 B2 * | 10/2013 | Kubo | A46B 5/02 15/206 |
| 2006/0213018 A1 * | 9/2006 | Gross | A46B 5/02 15/143.1 |
| 2007/0068549 A1 | 3/2007 | Wong | |
| 2011/0314624 A1 * | 12/2011 | Kubo | A46D 3/00 15/167.1 |
| 2015/0335141 A1 * | 11/2015 | Schar | A46B 1/00 15/106 |
| 2016/0000215 A1 | 1/2016 | Kalbfeld et al. | |

FOREIGN PATENT DOCUMENTS

| | | |
|---|---|---|
| DE | 102006040241 A1 | 3/2008 |
| EP | 0 932 371 B1 | 12/2001 |
| JP | 2004-242781 A | 9/2004 |
| JP | 2007 037791 A | 2/2007 |
| JP | 2013188299 A * | 3/2013 |
| JP | WO2013105549 A1 * | 3/2013 |
| JP | 2013-192866 A | 9/2013 |
| JP | 2017-000776 A | 1/2017 |
| WO | 2008/025443 A1 | 3/2008 |

\* cited by examiner

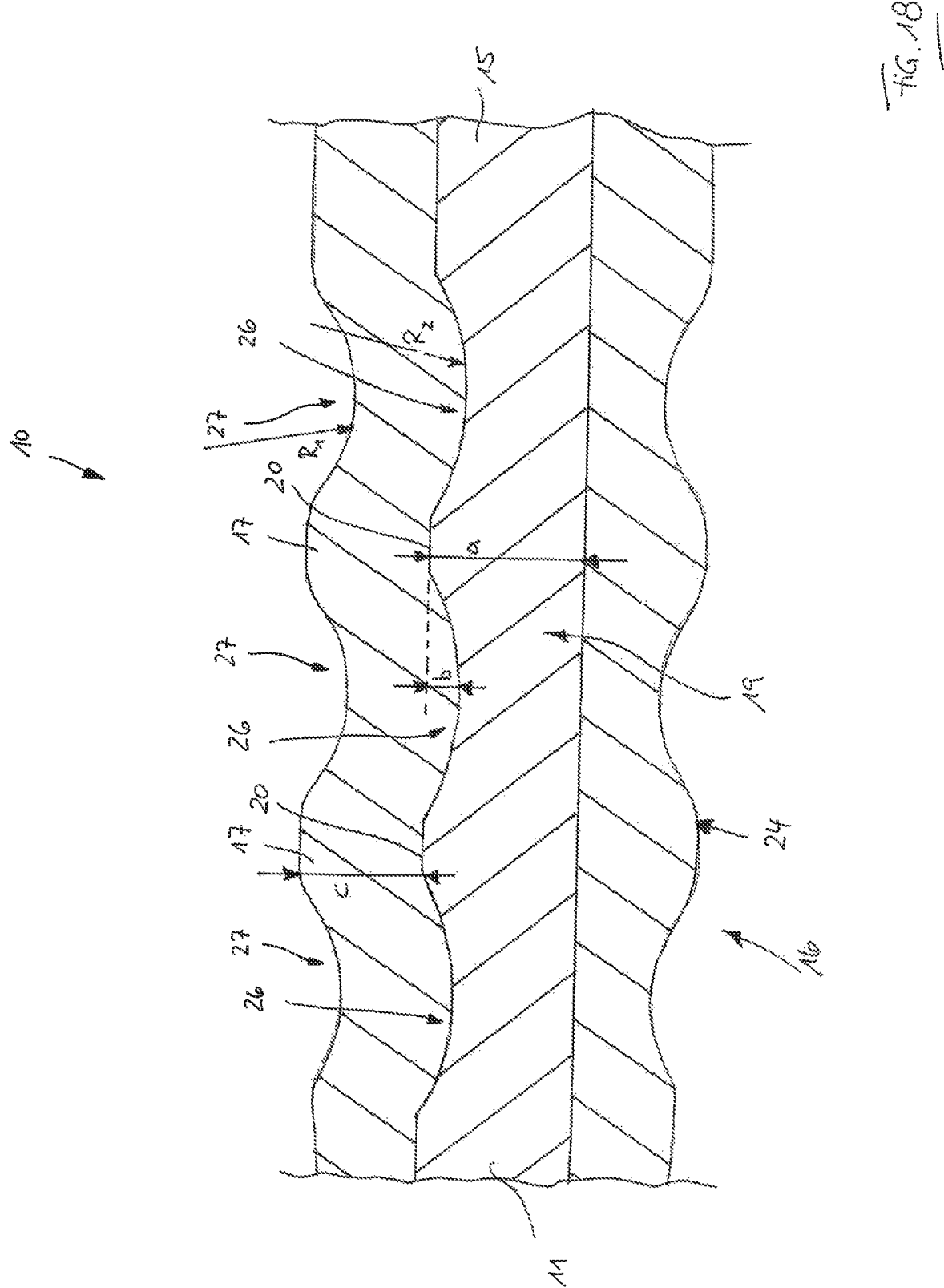

INTERDENTAL CLEANER

CROSS REFERENCE TO RELATED APPLICATIONS

This application is a United States National Phase Application of International Application PCT/EP2017/000507, filed Apr. 24, 2017, and claims the benefit of priority under 35 U.S.C. § 119 of German Application 10 2016 005 012.8, filed Apr. 26, 2016, the entire contents of which are incorporated herein by reference.

TECHNICAL FIELD

The invention relates to an interdental cleaner with a rod-shaped support, which is made of plastic and, in one end region thereof, is provided with a cleaning part made of flexible plastic, and a handle part made of plastic, wherein the support, at its end facing the handle part, is integrally connected to the handle part in a connection region via a web.

BACKGROUND

An interdental cleaner of this kind, which is also referred to as a toothpick, is known from EP 0 932 371, for example. The interdental cleaner disclosed therein has a rod-shaped support which is made of a dimensionally stable plastic, and at the rear end of which a handle part is integrally formed via a connection region. In its front end region facing away from the handle part, the support is provided with a flexible elastic cover, which can be formed with radially protruding structure elements, for example in the form of integrally formed fingers, lamellas or ribs, and forms a cleaning part. To clean the spaces between the teeth, the user grips the interdental cleaner by the handle part and guides the front end of the support, and therefore the cleaning part, into the interdental space and moves the interdental cleaner to and fro.

It has been found that the cleaning action largely depends on the way in which the user guides the interdental cleaner within the interdental space. The orientation of the interdental cleaner is largely determined by how the user arranges the handle part relative to the interdental space that is to be cleaned. Although the support has a certain elasticity and can be deformed elastically when a particular oblique setting of the cleaning portion is needed within the interdental space, this can be achieved only if the user suitably orients the entire interdental cleaner obliquely, which in many cases is difficult to do.

SUMMARY OF THE INVENTION

An object of the invention is to make available an interdental cleaner of the stated type which permits variable positioning of the cleaning part within the interdental space.

This object is achieved by an interdental cleaner having the features according to the invention. Provision is made that the connection region is configured as a joint, the web is provided at least partially with a sheath of flexible plastic, and the web has at least one protruding web rib, and/or at least one rib is formed on the outer face of the sheath.

The ribs and/or the web ribs within the meaning of the invention can be formed in different ways. On the one hand, it is possible, on the outside of the sheath and/or on the outside of the web, to introduce groove-like depressions spaced apart from each other and extending perpendicularly with respect to the longitudinal axis of the interdental cleaner, such a rib or a web rib is formed in each case between two adjacent depressions. On the other hand, the wall thickness of the sheath and/or of the web can be increased to form the ribs or web ribs.

The invention proceeds from the basic principle of forming a joint in the connection region that connects the support to the handle part. The joint is determined on the one hand by the geometric dimensions of the web in the connection region and/or by the choice of material. In particular, the flexible plastic arranged in the connection region acts as a spring and has considerable influence on the deformation properties of the interdental cleaner and on the forces required for this. By suitable choice of the material for the flexible plastic, for which in particular a thermoplastic elastomer or silicone is used, the deformation properties of the interdental cleaner can be predefined in a desired manner. The material of the rod-shaped support and the geometry of the rod-shaped support also have an influence on the deformation properties of the interdental cleaner, particularly in the region of the web.

When using the interdental cleaner, the user is able to angle the handle part relative to the support inserted in the interdental space by elastically deforming the connection region, such that regions of the interdental space that are difficult to reach can also be easily cleaned.

For the handling of the interdental cleaner, it has proven advantageous to provide mutual adjustment between the support and the handle part only about one axis, which preferably extends perpendicularly with respect to the longitudinal axis of the interdental cleaner. This can be achieved by a joint in the manner of a hinge joint.

To allow considerable forces to be applied by the user and to avoid an excessive deformation of the connection region, provision is made that the support and the handle part are connected integrally to each other via the web. In a first method step, the support, the web and the handle part are preferably injected as a monolithic component from a stable plastic, and, in a second method step, they are provided with the flexible plastic, at least in the connection region, in order to form the sheath. Provision can be made here that the web is at least partially surrounded by the flexible plastic, in particular completely surrounded by it, i.e. encapsulated in the flexible plastic.

On account of the web being present, the connection region has a preferably three-layered structure in cross section, since the centrally arranged web is covered on its top surface and bottom surface by flexible plastic, thereby giving a preferably complete sheath.

The joint of the connection region is obtained by the elastic deformation of the connection region or of the web and the sheath and not by the relative adjustment between two independent components. To obtain the deformation of the connection region in a desired manner in a predetermined direction, provision can be made according to the invention that at least one protruding rib or preferably several protruding ribs is/are formed on the outer surface of the sheath, which ribs preferably extend substantially perpendicularly with respect to the longitudinal axis of the interdental cleaner. The ribs form reinforcement elements, wherein, in the base region of the ribs and/or between the ribs, regions are provided which have less flexural strength compared to the ribs, such that the stiffening ribs can ensure the support deforms relative to the handle part.

Several ribs are preferably arranged alongside each other, in particular in parallel, such that, in the regions between adjacent ribs, preferred flexion axes or flexion regions form when a bending moment is applied between the support and the handle part.

Alternatively or additionally to the ribs of the sheath, provision can be made according to the invention that the web has at least one protruding web rib, preferably several protruding web ribs, which serve to ensure a deformation of the support relative to the handle part about a predetermined axis extending substantially perpendicularly with respect to the longitudinal axis of the interdental cleaner. For this purpose, the web rib preferably extends substantially perpendicularly with respect to the longitudinal axis of the interdental cleaner, and several web ribs are preferably arranged alongside and at a distance from each other, particularly in parallel. Here too, provision can be made that the web ribs are arranged only on one side of the web, although provision can alternatively be made that at least one web rib, preferably at least several web ribs, are provided respectively on opposite sides of the web.

According to the invention, the web has the stated web ribs and/or the sheath has the stated outer ribs. Preferably, the web is substantially plate-shaped and extends parallel to or even in the same plane as the likewise plate-shaped handle part. In one possible embodiment, provision can be made that the web ribs are formed on two opposite sides of the web. As an alternative to this, it is possible that the web ribs are formed only on one side of the web. In this case, the other side of the web facing away from the ribs can be plane and in particular unstructured.

The size and height of the web ribs determines the flexural strength of the connection region of the interdental cleaner. In one possible embodiment, provision can be made that the web ribs all have a similar cross-sectional dimension. Alternatively, provision can be made that the height and therefore the cross section of at least some ribs is different.

The rib or the ribs may be formed only on one side of the sheath. Alternatively, provision can be made that at least one rib is provided in each case on opposite sides of the sheath. However, it is also possible to dispense completely with the ribs of the sheath, as long as corresponding web ribs are formed on at least one side of the web.

The web connecting the support and the handle part to each other preferably extends in the direction of the longitudinal axis of the interdental cleaner and can have a cross section that is constant along its length. In a preferred embodiment of the invention, provision is made that the web has a cross section that widens in the direction of the handle part, while at the same time the thickness of the web can be constant along its length.

In order to influence the deformation properties of the interdental cleaner in the region of the web or to reduce its stiffness, provision can be made, in a development of the invention, that at least one passage/preferably several passages is/are formed in the web. The passages can be arranged spaced apart in the direction of the longitudinal axis of the interdental cleaner and can extend in the manner of slits transversely with respect to the longitudinal axis.

Preferably, the passages are filled with the flexible plastic of the connection region, such that, on the one hand, an increased spring effect is provided, and, on the other hand, the flexible plastic is connected with form-fit engagement to the support in the region of the web.

To ensure that the user can safely grip the handle part and does not let the latter slip, the handle part can be provided with a bearing surface made of a flexible plastic, in particular a thermoplastic elastomer or a silicone. The same material is preferably used for this purpose as is used also for the flexible plastic of the sheath. Provision can be made that the bearing surface of the handle part is integrally connected to the flexible plastic of the connection region, as a result of which the production is simplified and the parts are mutually supported and held.

The support is provided, in particular at its front end, with the cleaning part which, for example in a known configuration, is provided as a sleeve-shaped cover with radially protruding structure elements such as integrally formed fingers and/or embedded bristles. The cleaning part is likewise made of a flexible plastic, in particular of the same flexible plastic from which the sheath is also made. Provision can be made that the cleaning part is integrally connected to the flexible plastic of the connection region. The connection between the cleaning region and the sheath can be provided by a connection portion made of flexible plastic which preferably extends in the direction of the longitudinal axis of the interdental cleaner. Provision can be made that the connection portion is arranged in a channel, in particular an axial channel, of the support and is in particular received completely therein. A channel is preferably formed respectively on opposite sides of the support.

In a further possible embodiment of the invention, provision can be made that the cleaning part, the connection portion, the sheath of the web and the coating of the handle part are made from the same flexible elastic material and are produced in a single work step as a one-piece structure.

The material used for the support and/or the handle part is preferably a dimensionally stable plastic, in particular polypropylene, polyamide or polyethylene. The material can be reinforced with fibers, for example glass fibers, carbon fibers or natural fibers, in particular plant fibers.

A thermoplastic elastomer or silicone can be used as the flexible plastic for the cleaning part and/or the sheath and/or the bearing surface of the handle part.

Some dimensions of the web and of the sheath in the connection region are explained below.

In one possible embodiment, the web, on its underside, has a smooth, contour-free surface and merges smoothly and seamlessly into the adjacent portions of the support and of the handle part. On its opposite upper face, the web has several protruding web ribs, in particular two in number, which extend perpendicularly with respect to the longitudinal axis of the interdental cleaner and are arranged parallel to and at a distance from each other. The web ribs are formed by groove-like depressions being formed on the upper face of the web, said groove-like depressions extending perpendicularly with respect to the longitudinal axis of the interdental cleaner and being arranged parallel to and at a distance from each other. A web rib is formed in each case between two adjacent groove-like depressions.

The web has a maximum thickness a in the range between 0.5 mm and 1.0 mm, in particular 0.7 mm. The groove-like depressions have a depth b in the range of between 0.1a and 0.3a, in particular 0.2a. This also corresponds to the height of the web ribs.

The groove-like depressions preferably have a cross section in the shape of a segment of a circle, wherein the radius is in the range of between 0.8 mm and 1.6 mm, preferably 1.2 mm.

The connection region or the web is preferably completely encased by the sheath made of the flexible plastic, wherein the sheath is injected both onto the handle part and also onto the support.

Preferably, the sheath on the surface of the web has an approximately constant wall thickness and thus follows the contour of the web. In this way, several protruding ribs 17, preferably two protruding ribs 17, arranged in parallel and lying one behind the other in the direction of the longitudinal axis L of the interdental cleaner are likewise arranged on the upper face of the sheath precisely over the web ribs of the web. The wall thickness c of the sheath is intended to lie in the range of between 0.3 mm and 0.8 mm and to be in particular 0.5 mm to 0.6 mm.

Since the shape on the outer face of the sheath follows the shape on the upper face of the web, several groove-like depressions spaced apart from each other and extending perpendicularly with respect to the longitudinal axis of the interdental cleaner are also provided on the outer face of the sheath, wherein a rib is formed in each case between two adjacent groove-like depressions. The groove-like depressions also have, in cross section, the shape of a segment of a circle with a radius in the range of between 0.5 mm and 1.0 mm, in particular 0.7 mm.

The sheath is likewise provided on the underside of the web, but the sheath in the illustrative embodiment discussed does not follow the shape, i.e. the smooth surface of the web, in this region, and instead the groove-like depressions and the ribs extend completely around the web and are thus also present on the underside of the web on the outside of the sheath.

Further details and features of the invention will become clear from the following description of illustrative embodiments and by reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 18 is an enlarged sectional view corresponding to FIG. 3.

DESCRIPTION OF PREFERRED EMBODIMENTS

Figure 1:
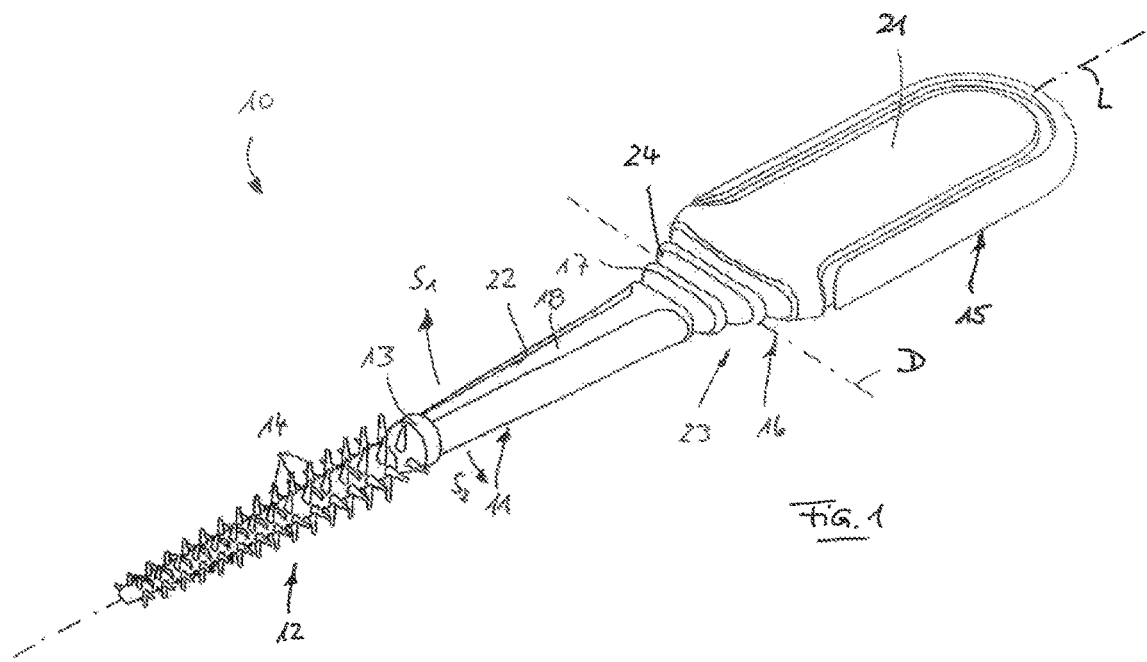
FIG. 1 is a perspective view of an interdental cleaner according to the invention.
Figure 2:
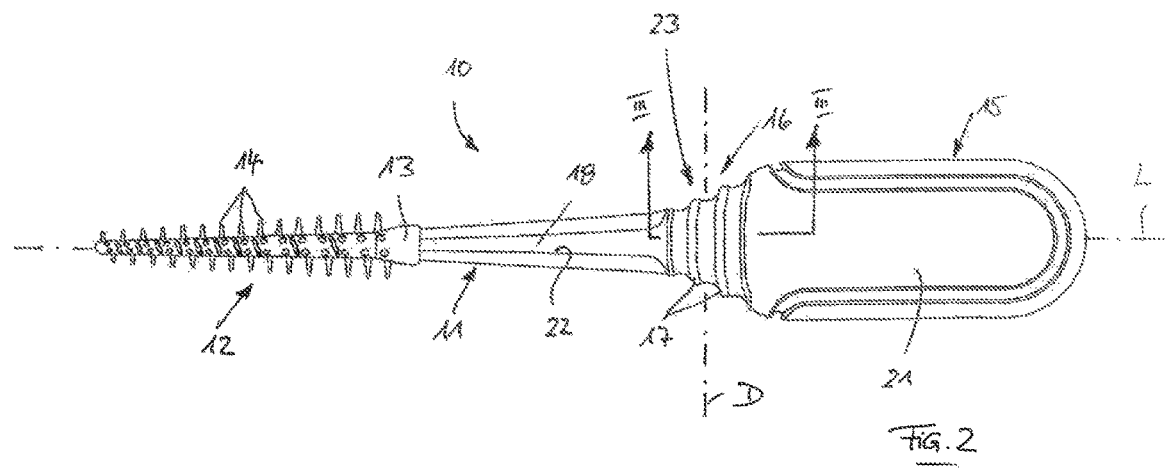
FIG. 2 is a plan view of the interdental cleaner according to FIG. 1.

Referring to the drawings, FIGS. 1 and 2 show an interdental cleaner 10 according to the invention, having a rod-shaped support 11 which is made of a dimensionally stable plastic and which tapers conically toward its front end, the left-hand end according to the figures. In the front end region, the left-hand region according to the figures, a cleaning part 12 in the form of a sleeve-shaped cover 13 made of a flexible plastic, for example a thermoplastic elastomer or silicone, is applied, in particular injected, onto the support 11. Radially protruding structure elements, in the form of integrally molded fingers 14, are formed on the outer surface of the sleeve-shaped cover 13.

At the rear end, the right-hand end according to FIGS. 1 and 2, the rod-shaped support 11 is connected to a substantially plate-shaped handle part 15 via a connection region 16. The handle part 15 is provided with a bearing surface 21 made of a flexible plastic, which can be the same material as that of the sleeve-shaped cover 13.

Figure 3:
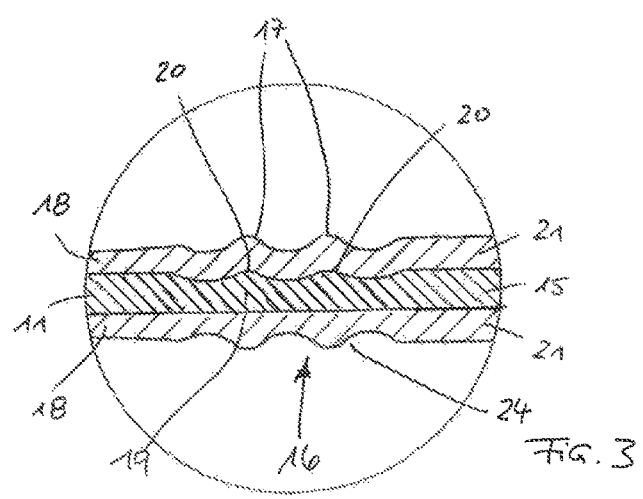
FIG. 3 is a sectional view along a section III-III in FIG. 2.

As can be seen from FIG. 3, the support 11 and the handle part 15 are integrally connected to each other via a web 19 extending axially in the direction of the longitudinal axis L of the interdental cleaner 10.

The connection region 16 forms a joint 23 about which the support 11 together with the cleaning part 12 is able to pivot about an axis D extending perpendicularly with respect to the longitudinal axis L of the interdental cleaner 10, as is indicated by the arrows S1 and S2 in FIG. 1. The pivoting therefore takes place perpendicularly with respect to the drawing plane according to FIG. 2.

As FIG. 3 shows, the support 11 and the handle part 15 are integrally connected to each other via the web 19. On its underside, the web 19 has a smooth, contour-free surface and merges smoothly and seamlessly into the adjacent portions of the support 11 and of the handle part 15. On its opposite upper face, the web 19 has two protruding web ribs 20 which extend perpendicularly with respect to the longitudinal axis of the interdental cleaner 10 and are arranged parallel to and at a distance from each other. The connection region 16 or the web 19 is completely encased by a sheath 24 made of the flexible plastic, wherein the sheath 24 is injected both onto the handle part 15 and also onto the support 11.

On its outer face, the sheath 24 has two protruding ribs 17 which are arranged one behind the other, parallel to and spaced apart from each other in the direction of the longitudinal axis L of the interdental cleaner 10 and which completely surround the connection region, in the illustrative embodiment shown, and are intended to be formed at least on the top surface and bottom surface of the latter. The ribs 17 of the sheath 24 lie exactly over the web ribs 20 of the web 19. Together with the web ribs 20, the ribs 17 form reinforcement regions, such that the axis D lies in the region between the ribs 17 or between the web ribs 20.

The cleaning part 12, the sheath 24 and the bearing surface 21 of the handle part 15 are all made of the same flexible elastic material and are produced as a one-piece structure by means of the cleaning part 12, both on its top surface (visible in the figures) and also preferably on the opposite underside, being connected to the connection region 16 via a rod-shaped connection portion 18. As FIG. 1 shows in particular, the connection portion 18 is arranged in an axial channel 22 of the support 11 and ends flush with the latter at the top.

The connection region 16 has a substantially frustoconical shape with a cross section that widens toward the handle part 15 in the direction of the longitudinal axis L. The web 19 follows this configuration (see FIGS. 6 and 5), although it can also have a constant cross section along its entire axial length (see FIGS. 4 and 5).

Figure 4:
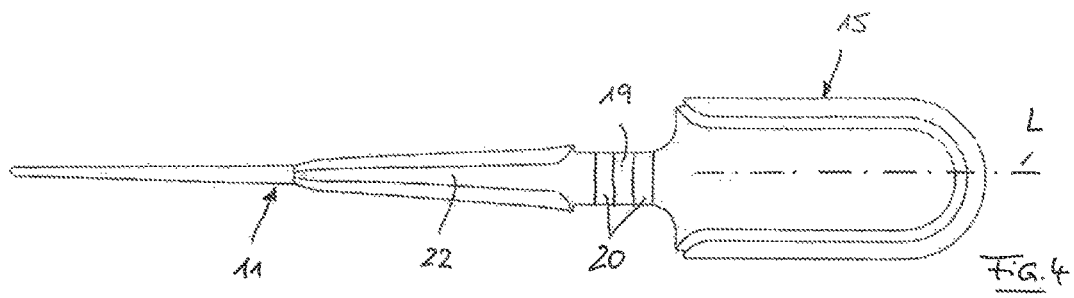
FIG. 4 is a plan view of the rod-shaped support, the web and the handle part as a one-piece component in one possible embodiment.
Figure 5:
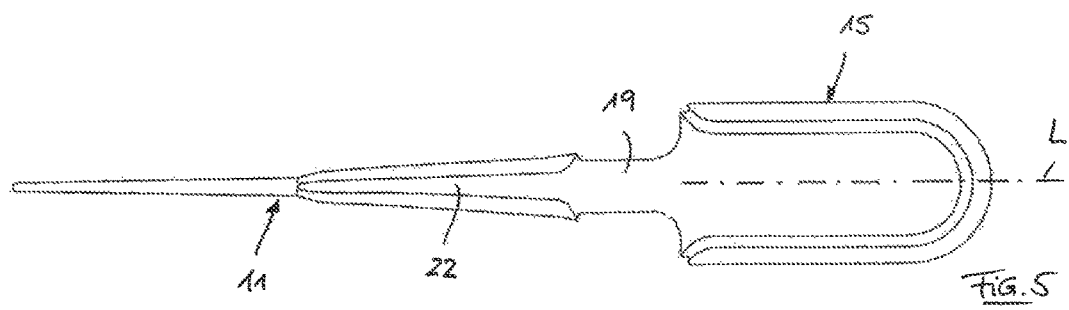
FIG. 5 is a bottom view of the component according to FIG. 4.

FIGS. 4 and 5 show only the component made of the dimensionally stable plastic in a first embodiment which comprises the support 11, the web 19 and the handle part 15 and which, in a subsequent method step, is encapsulated with the flexible plastic in order to form the sleeve-shaped cover 13, the connection portion 18, the sheath 24 and the bearing surface 21. The flexible plastic completely surrounds and encapsulates the web 19 in the connection region 16. The outer configuration of the connection region 16 corresponds to that of the illustrative embodiment according to FIGS. 1 and 2.

In the illustrative embodiment shown in FIGS. 4 and 5, the web 19 has a constant cross section over its axial length. On its upper face (FIG. 4), it is configured with the web ribs 20 extending perpendicularly with respect to the longitudinal axis L. On its opposite underside (FIG. 5), no ribs are provided, i.e. the web has a preferably plane lower surface.

When the component shown in FIGS. 4 and 5 is encapsulated with the flexible plastic, the sheath 24 formed in the connection region 16 can optionally have said ribs on both sides, although provision can also be made to form the ribs only on one side on the sheath, preferably on the same side on which the ribs of the web are also formed, or even to dispense entirely with ribs on the sheath, such that the sheath then has a smooth surface on the outside.

Figure 6:
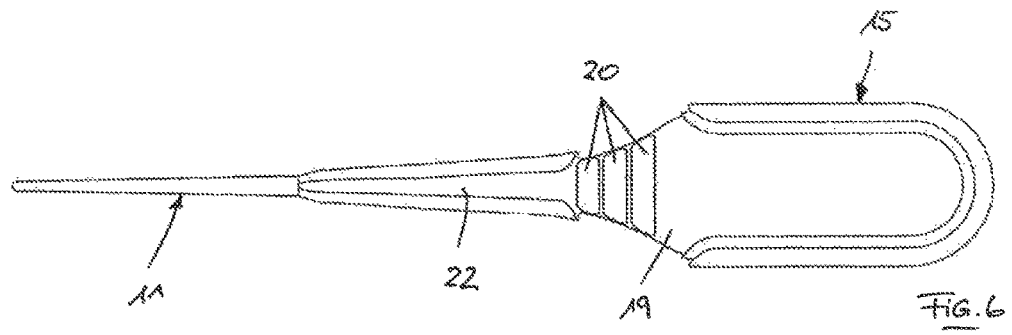
FIG. 6 is a view showing the rod-shaped support, the web and the handle part as a one-piece component in an alternative embodiment.
Figure 7:
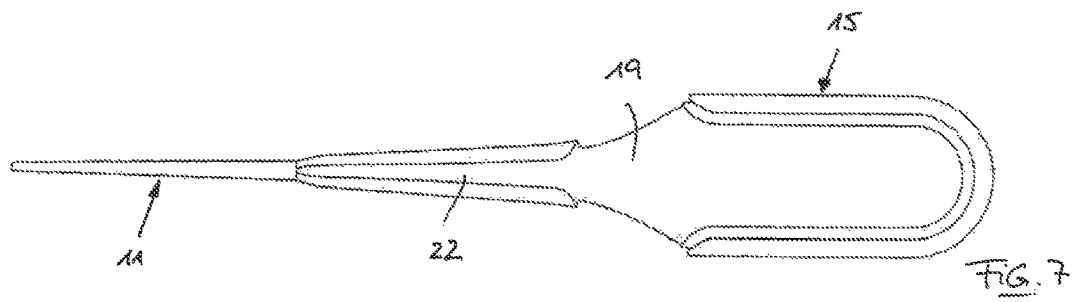
FIG. 7 is a bottom view of the component according to FIG. 6.

FIGS. 6 and 7 show a similar component to that of FIGS. 4 and 5 and differ from the latter only in that the web 19 has a cross section that widens toward the handle part 15 in the direction of the longitudinal axis L of the interdental cleaner 10.

The component shown in FIGS. 6 and 7 is also surrounded with the flexible plastic in the stated manner in a subsequent method step, and the above statements concerning the arrangement of the ribs also apply here accordingly.

Figure 8:
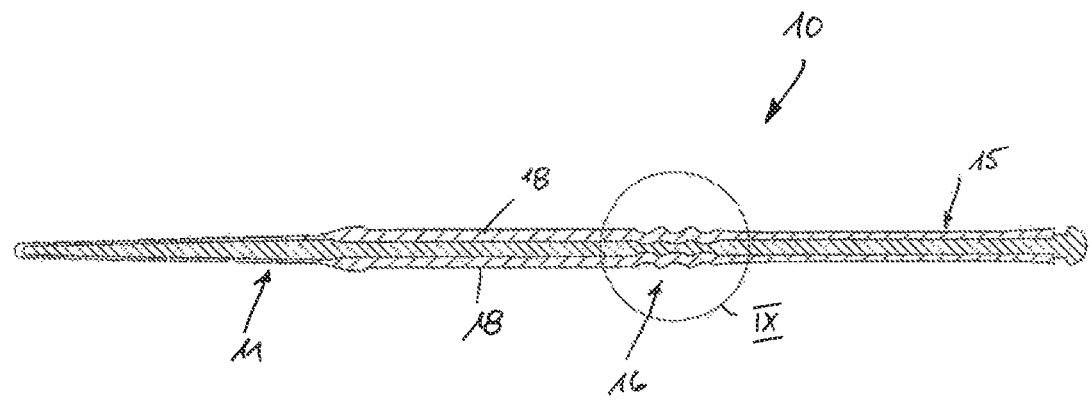
FIG. 8 is a longitudinal sectional view through the interdental cleaner according to a further embodiment.

FIG. 8 shows a longitudinal section through an interdental cleaner 10 in which the connection region 16 is configured in an alternative manner. The connection region 16 is shown in an enlarged view in FIG. 9.

Figure 9:
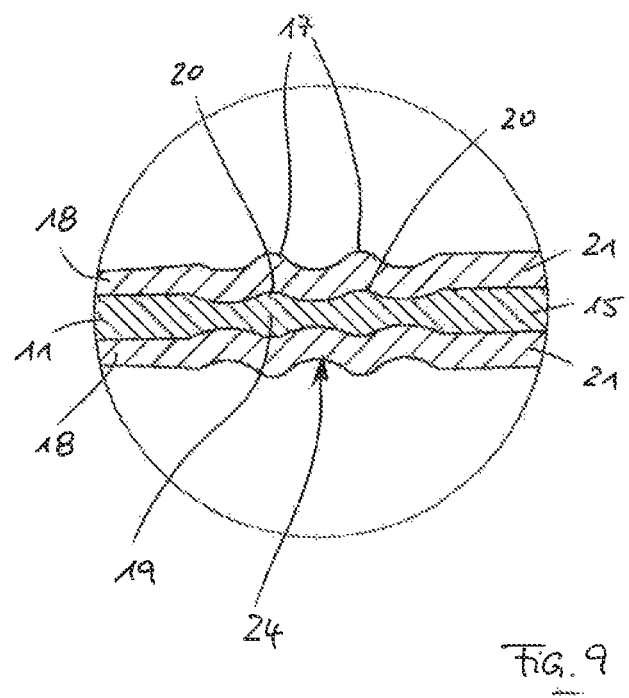
FIG. 9 is the detail view of detail IX from FIG. 8.

As can be seen from FIG. 9, the web 19, both on its upper face and on its underside, has in each case two protruding web ribs 20 extending perpendicularly with respect to the longitudinal axis L of the interdental cleaner 10. In the illustrative embodiment shown, the sheath 24 made of the flexible plastic has a constant thickness, such that the circumferential ribs 17 are also formed on the outer surface of the sheath 24. This embodiment thus has the web 19 with web ribs 17 on both sides and the sheath 24 with ribs 17 on both sides.

Figure 10:
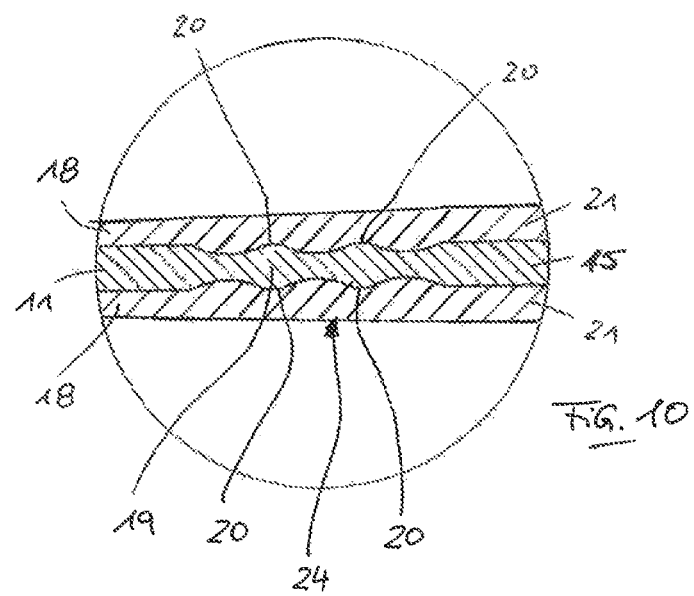
FIG. 10 is a sectional view, corresponding to FIG. 9, of an alternative embodiment.

FIG. 10 shows an alternative embodiment to FIG. 9 and differs from the latter in that the sheath 24 has no outer ribs and instead has a smooth outer surface on both sides, whereas the web 19 is provided with web ribs 20 on both sides.

Figure 11:
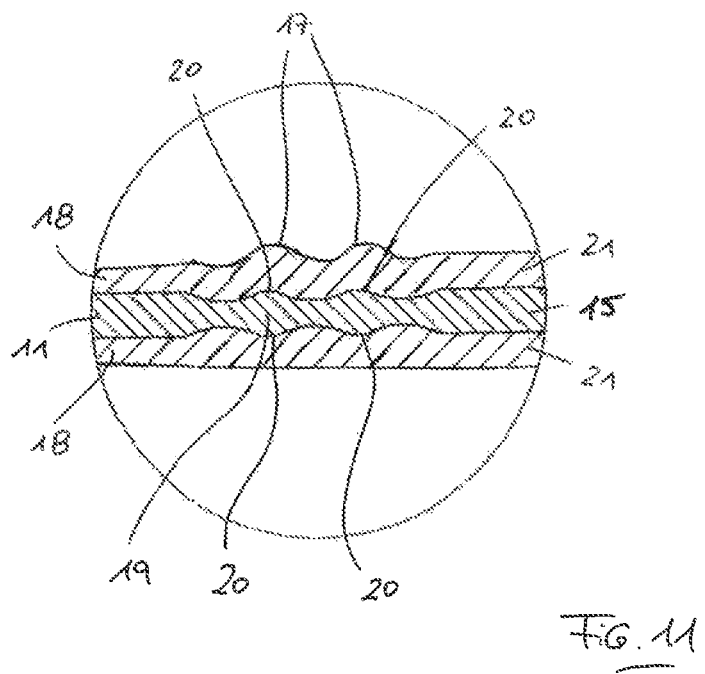
FIG. 11 is a sectional view, corresponding to FIG. 9, of a further alternative embodiment.

FIG. 11 shows an alternative to the embodiment according to FIG. 10. Here too, the web 19 is provided with web ribs 20 on both sides, but the sheath 24 has ribs 17 only on one side and has a smooth surface on the opposite side.

Figure 12:
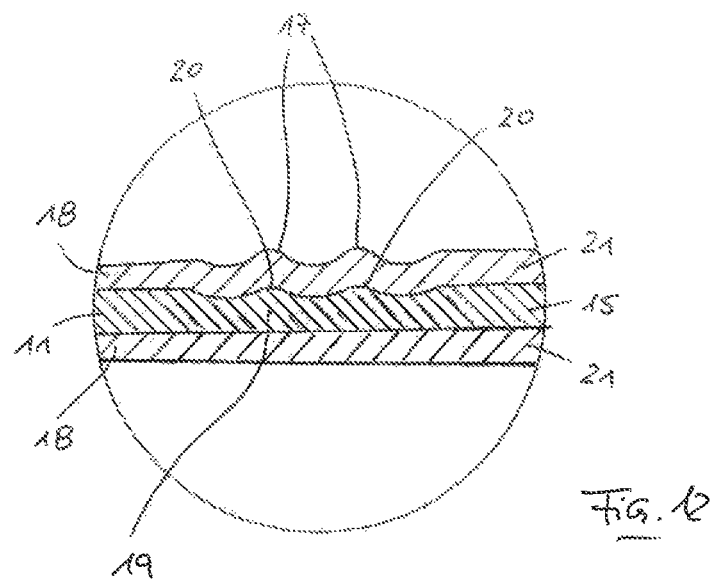
FIG. 12 is a sectional view, corresponding to FIG. 9, of a further alternative embodiment.

A further alternative embodiment is shown in FIG. 12. Here, the web 19 has two web ribs 20 on its upper face, whereas it has a smooth, preferably plane surface on its underside. The sheath 24 follows this configuration, such that the sheath 24 also has two ribs 17 on its upper face and has a smooth, preferably plane surface on its underside.

Figure 13:
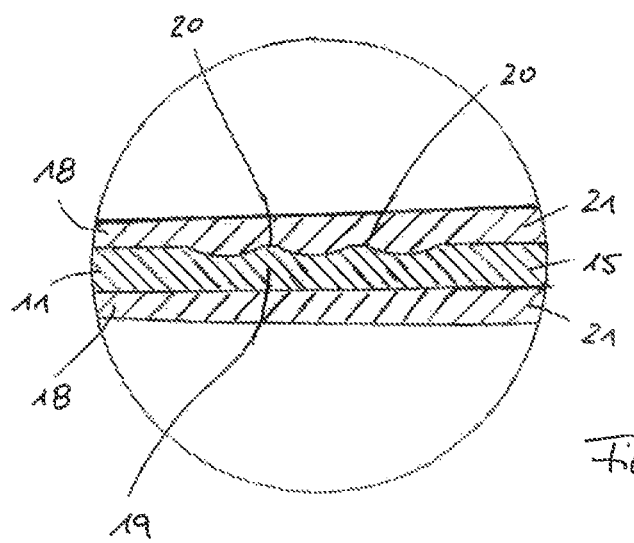
FIG. 13 is a sectional view, corresponding to FIG. 9, of a further alternative embodiment.

In the embodiment according to FIG. 13, the web 19 has two web ribs 20 on its upper face and a smooth, preferably plane surface on its underside. The sheath 24 has a smooth, preferably plane surface free of ribs both on its upper face and also on its underside.

Figure 14:
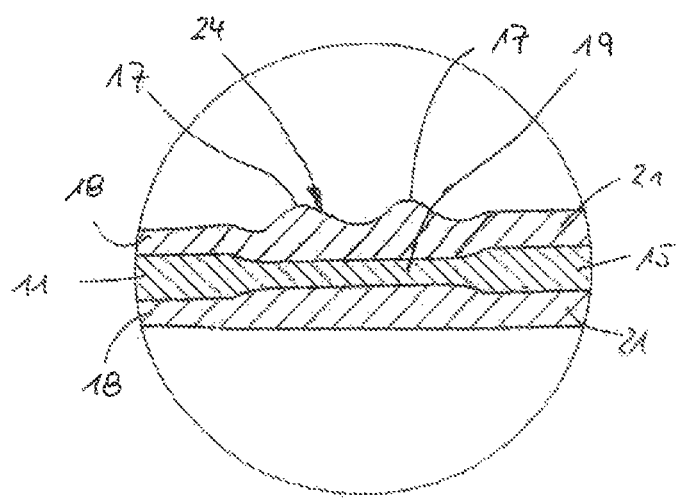
FIG. 14 is a sectional view, corresponding to FIG. 9, of a further alternative embodiment.

FIG. 14 shows the cross section in the connection region 16 with the web 19 according to a further alternative embodiment. As can be seen from FIG. 14, the support 11 is connected by the web 19 to the handle part 15, the web 19 having an overall height smaller than that of the support 11, and also smaller than that of the handle part 15, and having no web ribs but instead a smooth surface. The flexible plastic forms the sheath 24 and on the underside of the web 19 merges smoothly and seamlessly from the connection portion 18 into the surface of the sheath 24 and merges smoothly and seamlessly from the latter into the bearing surface 21 of the handle part 15. On the upper face of the web 19, the sheath 24 is provided with two protruding ribs 17 which extend perpendicularly with respect to the longitudinal axis L of the interdental cleaner 10. This embodiment thus has the web 19 without web ribs, and the sheath 24 with ribs 17 on only one side.

Figure 15:
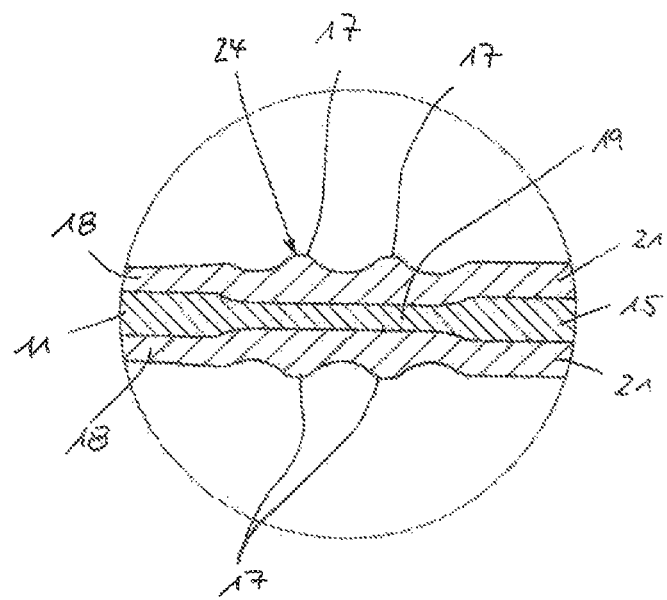
FIG. 15 is a sectional view, corresponding to FIG. 9, of a further alternative embodiment.

FIG. 15 shows a modification of the embodiment according to FIG. 14, differing from the latter only in that two protruding and circumferential ribs 17 of said type extending perpendicularly with respect to the longitudinal axis L of the interdental cleaner 10 are now arranged in the manner shown on both sides of the outer surface of the sheath 19.

Figure 16:
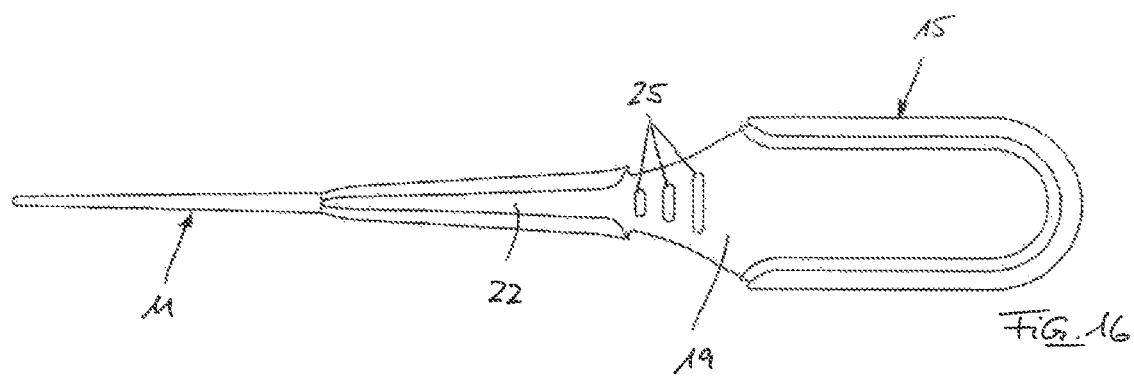
FIG. 16 is a view showing the rod-shaped support, the web and the handle part as a one-piece component in a further embodiment.
Figure 17:
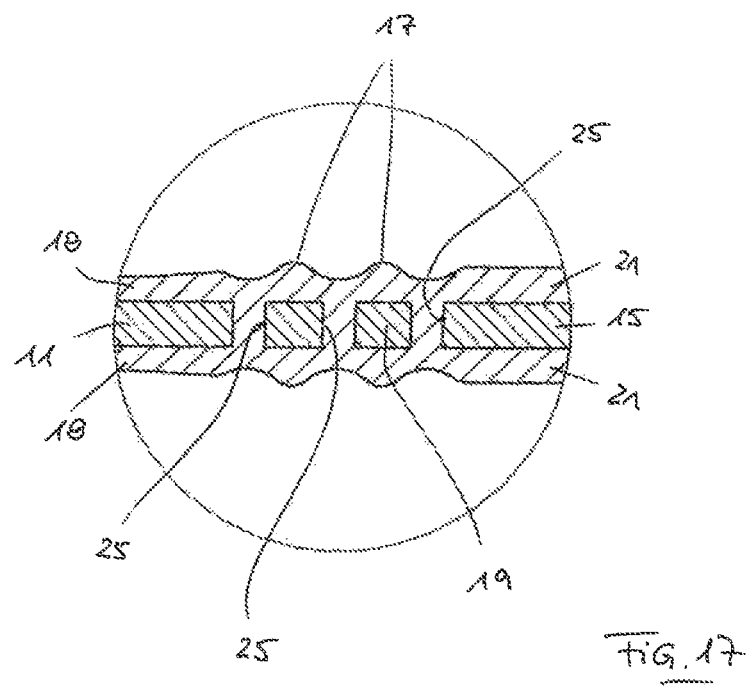
FIG. 17 is a partial longitudinal sectional view through the component according to FIG. 11, with the sheath applied.

FIGS. 16 and 17 show a further illustrative embodiment. The component shown in FIG. 16, comprising the rod-shaped support 11, the web 19 and the handle part 15, is characterized in that several passages 25 arranged at a distance from each other in the longitudinal direction of the interdental cleaner are provided in the web 19, which passages 25 are formed as linear slits and extend transversely with respect to the longitudinal axis of the interdental cleaner. The flexible plastic, which is applied to the component shown in FIG. 16, extends through the web 19 at the passages 25, as is shown in FIG. 17. In this way, the flexible plastic is held with form-fit engagement in the region of the web 19.

In the illustrative embodiment shown, ribs are formed on the outer face of the connection region 16, in the manner already explained, and the passages are offset in relation to the ribs in the longitudinal direction of the interdental cleaner.

The passages 25 in the web 19 can be provided in all of the embodiments that have been described above, i.e. in embodiments in which the web is provided with web ribs on both sides or only on one side or has no web ribs at all, and also in embodiments in which the sheath is provided with ribs on both sides or only on one side or has no ribs at all.

FIG. 18 shows an enlarged sectional view which corresponds to FIG. 3 and which is used to explain some dimensions of the web 19 and of the sheath 24 in the connection region 16.

In the illustrative embodiment shown in FIG. 18, the web 19, on its underside, has a smooth, contour-free surface and merges smoothly and seamlessly into the adjacent portions of the support 11 and of the handle part 15. On its opposite upper face, the web 19 has two protruding web ribs 20 which extend perpendicularly with respect to the longitudinal axis of the interdental cleaner 10 and are arranged parallel to and at a distance from each other. The web ribs 20 are formed by groove-like depressions 26 being formed on the upper face of the web 19, said groove-like depressions 26 extending perpendicularly with respect to the longitudinal axis of the interdental cleaner 10 and being arranged parallel to and at a distance from each other. A web rib 20 is formed in each case between two adjacent groove-like depressions 26.

The web 19 has a maximum thickness a in the range of between 0.5 mm and 1.0 mm, in particular 0.7 mm. The groove-like depressions 26 have a depth b in the range of between 0.1a and 0.3a, in particular 0.2a. This also corresponds to the height of the web ribs 20.

As FIG. 18 shows, the groove-like depressions 26 have a cross section in the shape of a segment of a circle, wherein the radius $R_2$ lies in the range of between 0.8 mm and 1.6 mm and is preferably 1.2 mm.

The connection region 16 or the web 19 is completely encased by the sheath 24 made of the flexible plastic, wherein the sheath 24 is injected both onto the handle part 15 and also onto the support 11.

As FIG. 18 shows, the sheath 24 on the surface of the web 19 has an approximately constant wall thickness and thus follows the contour of the web 19. In this way, two protruding ribs 17 arranged in parallel and lying one behind the other in the direction of the longitudinal axis L of the interdental cleaner 10 are likewise arranged on the upper face of the sheath precisely over the web ribs 20 of the web 19. The wall thickness c of the sheath 24 is intended to lie in the range of between 0.3 mm and 0.8 mm and to be in particular 0.5 mm to 0.6 mm.

Since the shape on the outer face of the sheath 24 follows the shape on the upper face of the web 19, several groove-like depressions 27 spaced apart from each other and extending perpendicularly with respect to the longitudinal axis of the interdental cleaner are also provided on the outer face of the sheath 24, wherein a rib 17 is formed in each case between two adjacent groove-like depressions 27. The groove-like depressions 27 also have, in cross section, the shape of a segment of a circle with a radius $R_1$ in the range of between 0.5 mm and 1.0 mm, in particular 0.7 mm.

The sheath 24 is likewise provided on the underside of the web 19, but the sheath 24 in the illustrative embodiment discussed does not follow the shape, i.e. the smooth surface of the web 19, in this region, and instead the groove-like depressions 27 and the ribs 17 extend completely around the web 19 and are thus also present on the underside of the web 19 on the outside of the sheath 24.

The stated dimensions and geometries also apply correspondingly for the further illustrative embodiments. While specific embodiments of the invention have been shown and described in detail to illustrate the application of the principles of the invention, it will be understood that the invention may be embodied otherwise without departing from such principles.

The invention claimed is:

1. An interdental cleaner comprising:
a rod-shaped support, which is made of plastic;
a cleaning part, wherein in one end region of the support, the support is provided with the cleaning part, which cleaning part is made of a flexible plastic; and
a handle part made of plastic, wherein:
the support, at a support end facing the handle part, is integrally connected to the handle part in a connection region via a web;
the connection region is configured as a joint;
the web is provided at least partially with a sheath made of a flexible plastic;
the web has at least one protruding web rib;
at least one rib is formed on the outer face of the sheath;
the web has a maximum thickness a in the range of between 0.5 mm and 1.0 mm;
the sheath has a thickness in the range of between 0.3 mm and 0.8 mm;
the web rib extends substantially perpendicularly with respect to a longitudinal axis of the interdental cleaner;
the at least one protruding web rib is one of several web ribs, which web ribs are arranged alongside and at a distance from each other;
the web ribs are arranged parallel to each other;
at least one groove depression is formed in the web parallel to the web ribs;
the groove depression has a cross section in a shape of a segment of a circle.

2. The interdental cleaner as claimed in claim 1, further comprising at least another protruding web rib, wherein at least one web rib is provided respectively on opposite sides of the web.

3. The interdental cleaner as claimed in claim 1, further comprising at least another protruding web rib, wherein the web ribs are formed only on one side of the web.

4. The interdental cleaner as claimed in claim 3, wherein a side of the web facing away from the web ribs is planar.

5. The interdental cleaner as claimed in claim 1, further comprising at least another protruding web rib, wherein a height of at least some web ribs is different.

6. The interdental cleaner as claimed in claim 1, wherein the at least one rib formed on the outer face of the sheath extends substantially perpendicularly with respect to a longitudinal axis of the interdental cleaner.

7. The interdental cleaner as claimed in claim 1, further comprising at least another rib formed on the outer face of the sheath, wherein at least one rib is provided respectively on opposite sides of the sheath.

8. The interdental cleaner as claimed in claim 1, wherein the ribs are formed only on one side of the sheath.

9. The interdental cleaner as claimed in claim 1, wherein several ribs formed on the outer face of the sheath are arranged alongside and at a distance from each other.

10. The interdental cleaner as claimed in claim 1, wherein the web extends in a direction of a longitudinal axis of the interdental cleaner.

11. The interdental cleaner as claimed in claim 1, wherein the web has a cross section widening in a direction of the handle part.

12. The interdental cleaner as claimed in claim 1, wherein at least one passage is formed in the web.

13. The interdental cleaner as claimed in claim 12, wherein:
at least another passage is formed in the web to provide several passages;
the several passages are arranged spaced apart in a direction of a longitudinal axis of the interdental cleaner.

14. The interdental cleaner as claimed in claim 12, wherein the passage is filled with the flexible plastic of the connection region.

15. The interdental cleaner as claimed in claim 1, wherein the handle part is provided with a bearing surface made of a flexible plastic.

16. The interdental cleaner as claimed in claim 15, wherein the bearing surface of the handle part is integrally connected to the flexible plastic of the sheath.

17. The interdental cleaner as claimed in claim 1, wherein the cleaning part is integrally connected to the flexible plastic of the sheath.

18. The interdental cleaner as claimed in claim 17, wherein the cleaning part is integrally connected to the flexible plastic of the sheath via a connection portion.

19. The interdental cleaner as claimed in claim 18, wherein the connection portion is arranged in a channel of the support.

20. The interdental cleaner as claimed in claim 19, wherein the support has another channel and the channels are formed respectively on opposite sides of the support.

21. The interdental cleaner as claimed in claim 1, wherein the web rib has a height in the range of between 0.1a and 0.3a.

22. The interdental cleaner as claimed in claim 1, wherein the sheath has a constant thickness on at least one side of the web.

23. The interdental cleaner as claimed in claim 1, wherein the groove depression has the cross section in the shape of the segment of the circle with a radius in a range of between 0.8 mm and 1.6 mm.

24. The interdental cleaner as claimed in claim 1, wherein at least one groove depression is formed in the sheath parallel to the at least one rib formed on the outer face of the sheath.

25. The interdental cleaner as claimed in claim 24, wherein the groove depression has a cross section in the shape of a segment of a circle with a radius in a range of between 0.5 mm and 1.0 mm.

26. An interdental cleaner comprising:
a rod-shaped support, which is made of plastic;
a cleaning part, wherein in one end region of the support, the support is provided with the cleaning part, which cleaning part is made of a flexible plastic; and
a handle part made of plastic;
a web comprising a web component and a sheath surrounding the web component, the sheath comprising flexible plastic, wherein:
the support, at a support end facing the handle part, is integrally connected to the handle part in a connection region via the web;
the connection region is configured as a joint;
the sheath comprises a plurality of sheath ribs;
the web component has a plurality of protruding web ribs located on only one side of the web component;
another side of the web component is free of protruding web ribs;
the another side being located radially opposite the one side of the web component with respect to a longitudinal axis of the handle;
each of the protruding web ribs is located at a spaced location from each other;
the web has a maximum thickness in the range of between 0.5 mm and 1.0 mm;
the sheath has a thickness in the range of between 0.3 mm and 0.8 mm;
each of the protruding web ribs extends substantially perpendicularly with respect to the longitudinal axis of the handle;
the protruding web ribs are arranged parallel to each other;
at least one groove depression is formed in the web component parallel to the plurality of protruding web ribs;
the at least one groove depression is located between one of the protruding web ribs and another one of the protruding web ribs;
the groove depression has a cross section in a shape of a segment of a circle.

27. The interdental cleaner as claimed in claim 26, wherein the sheath comprises a protruding sheath portion located in the at least one groove depression, the protruding sheath portion being located between one of the plurality of sheath ribs and another one of the plurality of sheath ribs, the sheath comprising an inner sheath surface, the inner sheath surface being free of protruding sheath portions, the inner sheath surface being in contact with the another side of the web component.

28. The interdental cleaner as claimed in claim 26, wherein the web component comprises a planar web surface portion on the another side of the web component, wherein a sheath depression and a sheath protruding portion are located between one of the sheath ribs and another one of the sheath ribs, the sheath protruding portion being arranged in the at least one groove depression, the sheath comprising a planar sheath portion, the planar sheath portion being in contact with the planar web surface portion.

29. The interdental cleaner as claimed in claim 28, wherein each of the one of the protruding web ribs and the another one of the protruding web ribs has a planar protruding web rib surface portion, the sheath having an inner sheath surface comprising a plurality of planar inner sheath surface portions, one of the planar inner sheath surface portions being in contact with the planar protruding web rib surface portion of one of the one of the protruding web ribs and the another one of the protruding web ribs and another one of the planar inner sheath surface portions being in contact with the planar protruding web rib surface portion of another one of the one of the protruding web ribs and the another one of the protruding web ribs.

30. The interdental cleaner as claimed in claim 29, wherein the sheath protruding portion is located between the one of the planar inner sheath surface portions and the another one of the planar inner sheath surface portions, wherein the planar web surface portion and the planar sheath portion are located radially opposite the one of the protruding web ribs, the another one of the protruding web ribs, the web depression, the sheath depression and the sheath protruding portion with respect to the longitudinal axis, the sheath protruding portion being located radially opposite the sheath depression with respect to the longitudinal axis.

* * * * *